J. H. PURDY.
Passenger Ticket.

No. 212,324. Patented Feb. 18, 1879.

Witnesses;
Frank Rosengren
H. Reid

Inventor;
J H Purdy

N. PETERS, PHOTO-LITHOGRAPHER, WASHINGTON, D. C.

UNITED STATES PATENT OFFICE.

JOHN H. PURDY, OF CHICAGO, ILLINOIS.

IMPROVEMENT IN PASSENGER-TICKETS.

Specification forming part of Letters Patent No. 212,324, dated February 18, 1879; application filed May 13, 1878.

*To all whom it may concern:*

Be it known that I, JOHN H. PURDY, of Chicago, in the county of Cook and State of Illinois, have invented a new and useful Improvement in Railroad-Tickets, which improvement is fully set forth in the following specification and accompanying drawings, in which—

Figure 1:
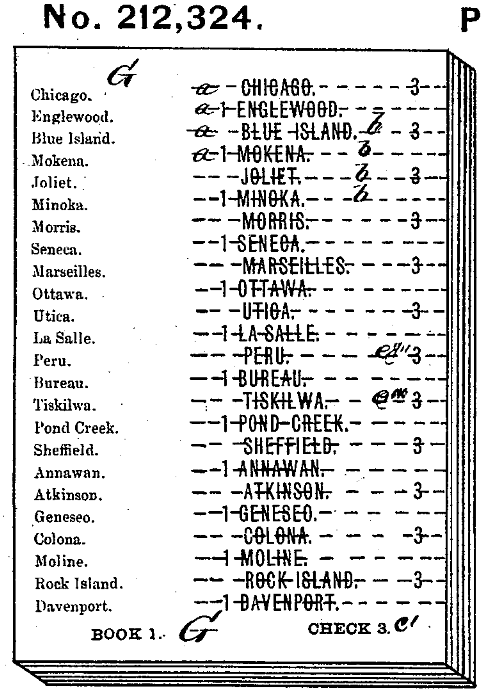
Figure 2:
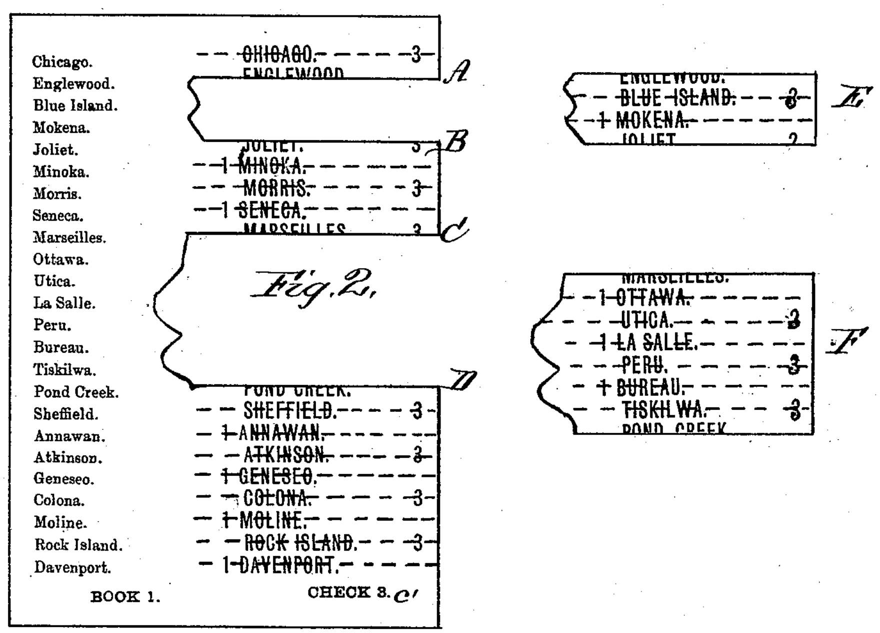

Figure 1 is a general view of a series of tickets made in comformity with my invention. Fig. 2 is a view of the same from which some tickets have been separated.

The object of my invention is to furnish a self-recording railroad ticket or check, one portion of which will form a receipt for a passenger, and another portion a stub or register to show the proper officials the value of the portion or receipt detached and paid for by the passenger.

Another object my invention is designed to accomplish is to prevent the receipt portion being used more than once by the passenger, should he or she retain it.

Another object I have in view is to furnish a receipt that shows exactly where and what portions of the road the passenger pays to be transported over.

The invention consists of a number of leaves of paper, pasteboard, or similar material, suitably connected together at one or more of its sides to form a tablet. Each leaf is numbered consecutively, and each contains a list of names of stations on a railroad or transportation line. Each name on the list should have near it the same number as the page number, and each name partially severed by an incision or series of indentations separating the name or designation of the station into two parts through the letters of the name and paper on which they are printed.

In using tickets according to my invention, the conductor or agent is supplied with a complete tablet. On receiving a fare for passage from one station to another, he is required to tear off from one leaf a list of stations the passenger will pass, including a half of the station designation he got on at and a half of the station designation he should get off at. This should be handed to the passenger, and is a receipt for the money paid and a ticket for the journey. The conductor or agent retains the mutilated leaf, which shows at any time to a person familiar with the rates of fare the proper value of the detached part. The mutilated leaf shows also the form of the detached part. In this way it is rendered useless for any subsequent ride, for if offered for a passage the conductor, by looking at the mutilated leaves of his tablet, can see at once whether it was detached from any of the leaves used on the trip then being made, for the names of stations may be found to correspond to a blank in a mutilated leaf; but the torn and uneven edge forming one side of the receipt will not correspond to any leaf but the one from which it was torn; and, to make proof still more positive that a ticket was sold for a previous ride, the consecutive numbers against the names will show what leaf of the tablet it was torn from.

The leaves may be used for more than one ticket if the tickets are for short distances, as will be seen by the drawings.

As shown in Fig. 2, a piece has been detached from A to B and from C to D, the detached pieces forming two tickets, E and F.

In Fig. 1, G G is the ticket. *a a a* show the names of the stations on the road, partially divided by an incision or series of indentations, as shown at *b b b*. At $c'$ is the consecutive number of the leaf, and $c''$ $c'''$ are numbers opposite and near the station designations, and correspond to whatever $c'$ is.

In Fig. 2 the leaf is shown mutilated—that is, two tickets have been detached. The first ticket, E, is separated through the words "Englewood" and "Joliet," and is a receipt for money paid for a ride from Englewood to Joliet.

The ticket F is, for the same reason, good for a ride from Marseilles to Pond Creek. The remaining portion may be made into other tickets, if required. The words and parts undetached and (of course) unsold are held together by the margin in the positions in which they were printed. The designations of stations on the ticket should be printed with narrow but high letters, which can be read or understood if a half of each word is cut off or separated; or the letters may be smaller and the station designated twice, in which modification the separation would still be made in the center of the station designation.

I am aware that tickets have been heretofore made containing a list of names of stations. This I do not claim.

What I claim is—

A railroad or other ticket having a list of stations forming a column on one of its edges, the names composing the list and the ticket being partially severed longitudinally through the names, and having an unsevered margin, to which all the names are connected, substantially as and for the purpose described.

J. H. PURDY.

Witnesses:
IRVING G. HATCH,
R. P. EIGHINE.